US 7,151,559 B2

(12) United States Patent
Matsuda

(10) Patent No.: US 7,151,559 B2
(45) Date of Patent: Dec. 19, 2006

(54) RECEPTION PERFORMANCE MEASURING APPARATUS FOR TELEVISION SIGNAL

(75) Inventor: Yasunori Matsuda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 557 days.

(21) Appl. No.: 10/626,784

(22) Filed: Jul. 24, 2003

(65) Prior Publication Data

US 2004/0150721 A1    Aug. 5, 2004

(30) Foreign Application Priority Data

Jul. 30, 2002    (JP)    ............................. 2002-221840

(51) Int. Cl.
*H04N 5/21*    (2006.01)
*H04N 17/00*    (2006.01)
*G01R 27/02*    (2006.01)

(52) U.S. Cl. ...................... 348/180; 348/614; 324/606; 324/607

(58) Field of Classification Search ................ 348/180, 348/181, 184, 185, 186, 192, 193, 731, 607, 348/614; 324/605–628; 455/226.1, 226.2, 455/226.3
See application file for complete search history.

(56) References Cited

U.S. PATENT DOCUMENTS 4,425,578 A * 1/1984 Haselwood et al. .......... 725/14
5,260,784 A * 11/1993 Kamiyama et al. ......... 348/180
6,734,898 B1 * 5/2004 Zeidler ....................... 348/183
6,741,277 B1 * 5/2004 Rau ............................ 348/181

FOREIGN PATENT DOCUMENTS

| JP | 2000-32365 | 1/2000 |
| JP | 2000-299665 | 10/2000 |
| JP | 2002-94487 | 3/2002 |

OTHER PUBLICATIONS

Patent Abstracts of Japan No. 2002-094487 published Mar. 29, 2002 (1 page).
Patent Abstracts of Japan No. 2000-299665 published Oct. 24, 2000 (1 page).
Patent Abstracts of Japan No. 2000-032365, published Jan. 28, 2000 (1 page).

* cited by examiner

*Primary Examiner*—Michael H. Lee
(74) *Attorney, Agent, or Firm*—Osha Liang LLP

(57) ABSTRACT

When a TS (Transport Stream) generator generates a TS, the TS is modulated by a signal modulator and outputted to a tuner set. In the tuner set, various noises generated by a noise source are added to an input signal, reception processing is performed, and then the resultant signal is outputted to a LVDS (Law Voltage Differential Signal) converter. The LVDS converter converts the input signal into a LVDS of the same format as TS, and outputs the LVDS to an error rate measuring device. The error rate measuring device find a difference between the generated TS and the inputted LVDS while adjusting a synchronization and outputs the difference to a personal computer. The personal computer compares the inputted difference with a predetermined BER (Bit Error Rate), and determines performance regarding the reception process of the tuner set based on the comparison result.

15 Claims, 2 Drawing Sheets

RECEPTION PERFORMANCE MEASURING APPARATUS FOR TELEVISION SIGNAL

BACKGROUND OF THE INVENTION

1. Field of the Invention

The present invention relates to a reception performance measuring apparatus and, more particularly, to an apparatus for measuring reception performance of a TV (abbreviation for television) signal.

2. Description of the Background Art

Conventionally, a TV input signal is displayed in the form of an image on a screen via a tuner set by a CVBS (Composite Video Base-band Signal).

In measuring reception performance of TV signal by a tuner set, while changing conditions of each channel, appearance of noise on the screen is monitored by visual check for every condition being changed. As a result of such a monitoring, when noises do not appear within a prescribed period of time (for example, 20 msec), it is determined that the reception performance of the tuner set is right.

As described above, since conventional measurement of reception performance relied on manual measurement by an operator and hence entailed human errors, the efficiency was not satisfactory.

On the other hand, as a technique relating to measurement of reception of TV signal, an apparatus disclosed in Japanese Patent Laying-Open No. 2000-32365 is known. In this apparatus, a correction bit number outputted from an error rate detection circuit is inputted into a microcomputer control circuit, and divided by a reference bit number stored in the microcomputer control circuit by means of software, and then the result is outputted as an error rate signal.

Furthermore, Japanese Patent Laying-Open No. 2000-299665 discloses a technique of simultaneously measuring a reception level of electric wave and a bit error rate.

Furthermore, Japanese Patent Laying-Open No. 2002-94487 discloses a procedure of making a computer execute bit error measurement of transmission line.

The techniques disclosed in the above publications merely disclose measuring or detecting of bit error of digital data, and not suggest any techniques concerning measurement of reception performance of composite signal of TV signal.

SUMMARY OF THE INVENTION

It is therefore an object of the present invention to provide an apparatus for measuring reception performance of a TV signal.

In order to achieve the above object, an apparatus for measuring performance of a TV (television) signal reception processing device according to an aspect of the present invention includes: a generating section for generating and outputting a digital signal; a noise section for generating a predetermined level of noise; a signal comparing section; and a determining section. The signal comparing section compares an analog TV signal corresponding to the digital signal outputted from the generating section, the analog TV signal being added with the noise generated by the noise generating section and subjected to reception processing by a reception processing device arranged in advance, with the digital signal outputted from the generating section between digital signals, and then the determining section determines the performance based on the comparison result by the signal comparing section.

According to the above reception performance measuring apparatus, the analog TV signal after being added with the noise generated by the noise section and subjected to reception processing by the reception processing device, and the original digital signal generated by the generating section are compared with each other between digital signals, and the performance is determined based on the comparison result. Therefore, it is possible to automatically determine and measure the performance of the reception processing device of a TV signal without human operations.

Preferably, the predetermined level is selected while being variably adjusted. Accordingly, it is possible to variably adjust the noise level to be generated and forcibly added for the purpose of measuring performance, so that the freedom of performance measurement, as well as accuracy of performance measurement are improved.

Preferably, the generating section has a signal modulator which receives a digital signal corresponding to the supplied TV signal, modulates the received digital signal into an electric wave and outputs the same. In this manner, the digital signal can be converted to an analog TV signal, so that it is possible to measurement the digital signal more easily.

In the reception performance measuring apparatus, the signal comparing section preferably has a signal converting portion which receives the analog TV signal having subjected to reception processing and converts the received analog TV signal into a digital signal for comparison, and compares the digital signal generated by the generating section with the digital signal converted by the signal converting portion. Therefore, since comparison is made between digital signals, by using the comparison result, it is possible to determine the performance of the reception processing more accurately.

Preferably, the reception performance measuring apparatus further includes an outputting portion for outputting determination made by the determining section. Accordingly, the content of determination of performance measurement can be presented via the outputting portion, enabling the user to immediately know the result of the performance measurement by checking the content of the presentation.

Preferably, the predetermined level is outputted to the above outputting portion in addition to the determination. Therefore, in addition to the content of determination, the noise level currently applied is presented via the outputting portion, so that the user can also confirm anti-noise level regarding reception processing by the reception processing device which is an object to be measured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A TV receiver receives a signal of a designated channel received via a tuner set, and displays an image on a screen based on a CVBS outputted therefrom. Therefore, in any tuner sets, the signal inputted will be outputted in the form of a CVBS. By converting the outputted CVBS into a LVDS (Low Voltage Differential Signal) of TS (Transport Stream) format, it is possible to detect an error rate by means of an error measuring device. By comparing the detected error rate with a reference rate and making a determination, reception performance of the tuner set can be measured. By making a personal computer execute this determination in accordance with a program stored in advance, it is possible to automatically measure the reception performance without human works. In measurement of reception performance, it is possible to measure the reception sensitivity, frequency difference and ghost noise and the like by appropriately combining measuring machines.

Figure 1:
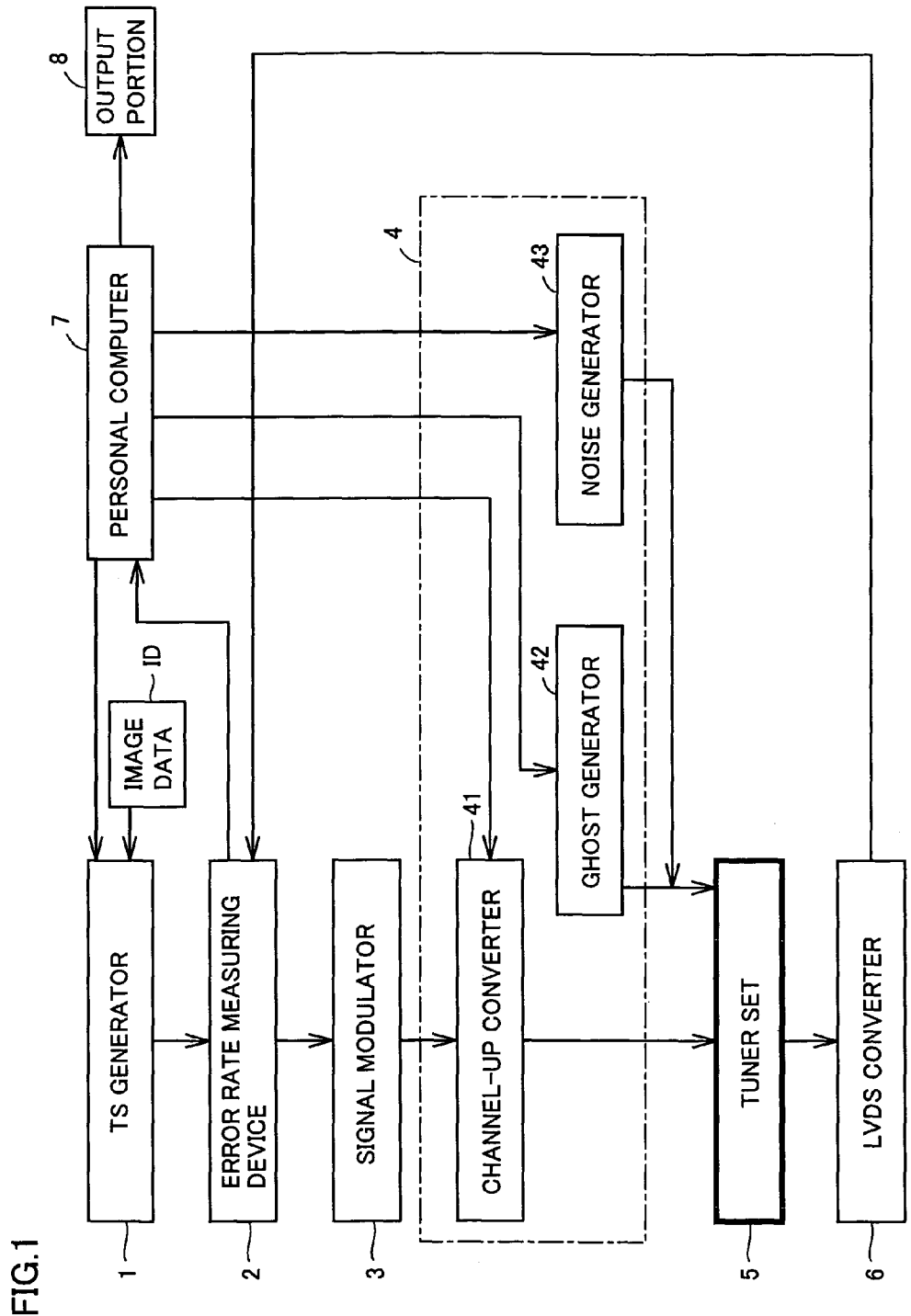
FIG. 1 is a schematic configuration diagram of a reception performance measuring apparatus according to an embodiment of the present invention.
Figure 2:
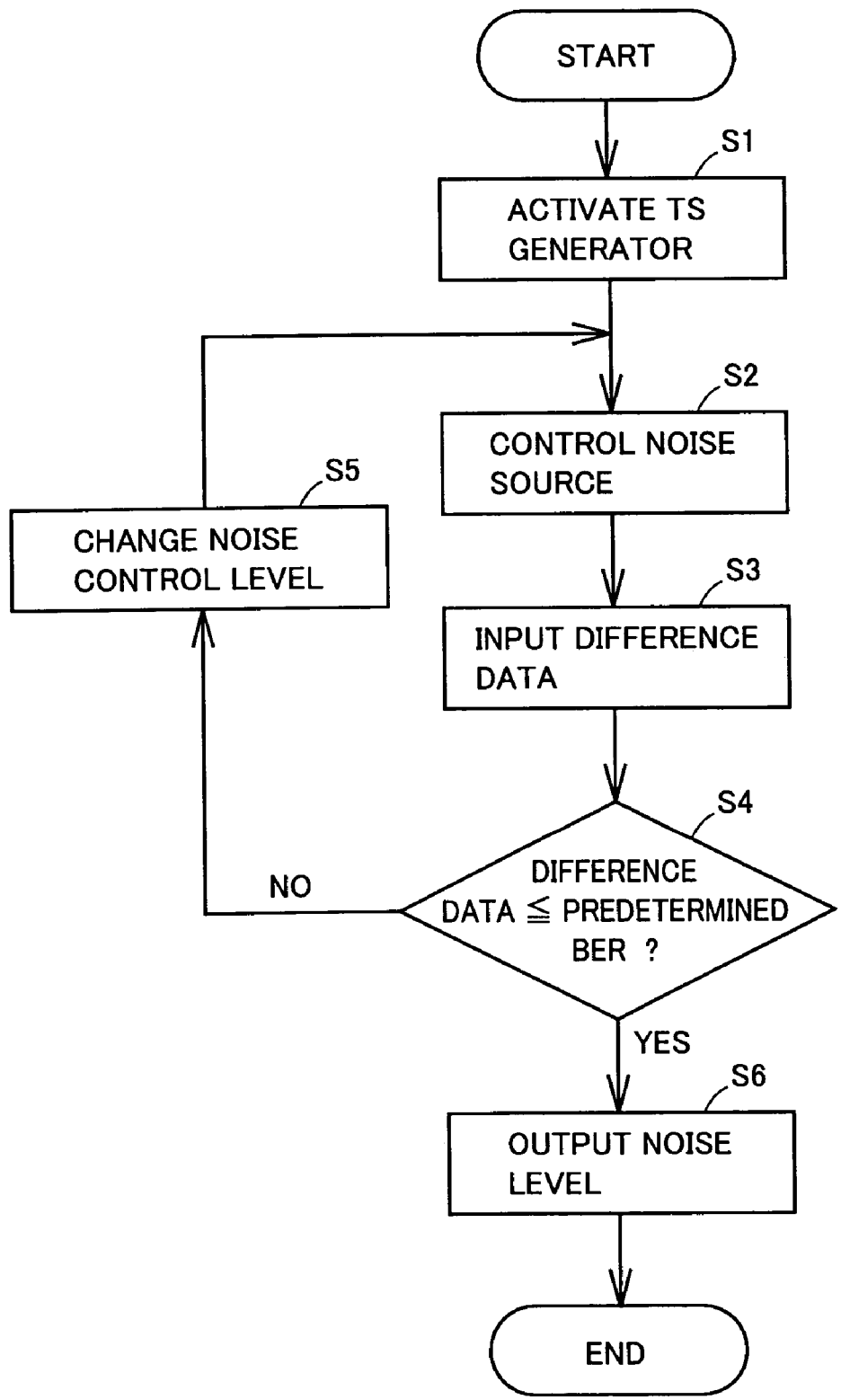
FIG. 2 is a flowchart of processing procedure concerning measurement of reception performance.

FIG. 1 shows a configuration of a reception performance measuring apparatus according to an embodiment of the present invention, and FIG. 2 shows a processing procedure concerning measurement of reception performance.

Now referring to FIG. 1, a reception performance measuring apparatus includes a TS generator 1 for generating a TS which is a picture signal digitized based on image date ID for measuring reception performance of a tuner set 5 which is an object to be measured, an error rate measuring device 2, a signal modulator 3 which receives the TS and transmits the received TS as an electric wave, a noise source 4 for generating various noises concerning TV signals, a LVDS converter 6 which receives a received CVBS and converts the CVBS to output a LVDS of digital signal, and a personal computer 7 to which an output portion 8 such as a screen is connected. Tuner set 5 receives (at its input) a digital signal, and executes reception processing including tuning to send (output) the result.

In order to execute measurement of reception performance of tuner set 5, a flowchart shown in correspondence with a program stored in advance in personal computer 7 is provided by FIG. 2. The operation will be described with reference to FIGS. 1 and 2. First, when TS generator 1 is activated by personal computer 7 (step S1), TS generator 1 generates a TS based on image date ID supplied thereto and outputs the TS to error rate measuring device 2. Image date ID may be supplied to TS generator 1 from personal computer 7. Also, TS generator 1 may generate a TS of prescribed pattern without using image date ID when it is actuated.

The TS passes through error rate measuring device 2 and is supplied to signal modulator 3. Personal computer 7 controls noise source 4 so that various noises of selected levels are generated (step S2).

Specifically, noise source 4 has a channel-up converter 41, a ghost generator 42 and a noise generator 43. Channel-up converter 41 adjusts the strength of input digital signal in accordance with the control by personal computer 7 and outputs the result to tuner set 5. By adjusting the signal strength or noise source 4, it is possible to artificially set the pattern of signal to be sent to tuner set 5 from a station. Ghost generator 42 generates a ghost noise of the level based on the control by personal computer 7, namely a white noise due to reflection, to give the ghost noise to tuner set 5. Noise generator 43 generates a white noise of the predetermined level based on the control by personal computer 7, to give the white noise to tuner set 5. Kinds of generated noises are not limited to the above. Although all kinds of noises are generated by noise source 4 in this description, the kind of noise to be generated based on the control by personal computer 7 may be selected from the above kinds.

In the manner as described above, it is possible to readily generate the digital TV signal to be sent to tuner set 5 from the TS. Further, since the level of the generated noise is variably adjusted and selected during measurement of performance, it is possible to gradually elevate or lower the level in the course of the measurement, and hence the freedom of measurement increases. Also the level may be adjusted for every kind of noise.

Tuner set 5 executes reception processing including prescribed tuning on a digital signal containing noises, namely the input digital signal from channel-up converter 41 to which noise signals outputted from ghost generator 42 and noise generator 43 are added, and outputs a CVBS. Then LVDS converter 6 receives at its input the CVBS outputted having added with noises and subjected to reception processing as described above, converts it into a LVDS, and outputs the LVDS.

The LVDS outputted from LVDS converter 6 has the same format as that of the TS outputted from TS generator 1. Error rate measuring device 2 compares the TS inputted from TS generator 1 with the LVDS inputted from LVDS converter 6 while adjusting synchronicity of these signals by a known procedure, to detect a difference therebetween, and outputs the data of difference thus detected to personal computer 7. In this manner, since signal comparison is achieved by comparing the digital signal TS which is a basis of generating the analog TV signal with the digital signal LVDS (having the same format as TS) obtained by converting the analog TV signal after reception processing, it is possible to determine the performance of the reception processing described later more accurately by using such a comparison result.

Personal computer 7 receives at its input the supplied data of difference, and variably adjusts the noise level so as to control each portion of noise source 4 based on a difference between the inputted difference data and a predetermined level of BER (Bit Error Rate) (steps S3 to S5).

At this time, when the difference data represents the predetermined level of BER or less (YES in step S4), it is determined that the level of noise currently added to the signal is allowed for reception processing of tuner set 5, or is an allowable level for required performance, and personal computer 7 outputs the determination to output portion 8 (step S6). When the difference data is not less than the predetermined level of BER (No in step S4), it is determined that the level of noise currently added to the signal is not allowed for reception processing of tuner set 5, or is not an allowable level for required performance, and personal computer 7 outputs the determination to output portion 8 and controls each portion of noise source 4 so that the level of noise added to the signal becomes lower (step S5). Thereafter, the processing returns to step S2, and the subsequent processes are executed in the similar manner. A level of noise currently selected may be outputted to output portion 8 together with the determination result.

Therefore, the user can also measure the anti-noise level concerning reception processing of tuner set 5 which is to be inspected by confirming the determination result or level of noise outputted to output portion 8.

By appropriately combining the kinds of noises generated by devices included in noise source 4, it is possible to measure a reception sensitivity representing an allowable signal strength which complies with the standard (required performance) of tuner set 5, a frequency difference representing an allowable frequency difference from frequency range for a specific cannel, a ghost nose and the like.

Although this description takes tuner set 5 as an example of inspection object, a TV set itself may be inspected. In addition, the standard of TV signal of reception signal may comply with either ATSC or OFDM (Orthogonal Frequency Division Multiplexing) without particularly limited.

According to the above-described configuration, since it is possible to automatically measure the reception performance, reading errors of spec value made by human at the time of visual measurement are avoided, and the measurement can be continued for a prolonged time.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for measuring performance of a reception processing device of a television (TV) signal, comprising:
    a generating section configured to generate and output a digital TV signal;
    a noise section configured to generate a predetermined level of noise;
    a reception processing device configured to perform reception processing on the digital TV signal having added thereto the predetermined level of noise, and to output an analog TV signal corresponding thereto;
    a converter configured to convert the analog TV signal to a second digital TV signal;
    a signal comparing section configured to compare the second digital TV signal with said digital TV signal outputted from said generating section; and
    a determining section configured to determine said performance based on a comparison result of said signal comparing section.

2. The reception performance measuring apparatus according to claim 1, wherein said predetermined level is variably adjusted.

3. The reception performance measuring apparatus according to claim 2, wherein said generating section includes a signal modulating portion configured to modulate said generated digital TV signal into an electric wave and outputting the electric wave.

4. The reception performance measuring apparatus according to claim 3, wherein said signal comparing section includes a signal converting portion configured to receive said analog TV signal after said reception processing, to convert said analog TV signal into said second digital TV signal for said comparison, and to compare said digital TV signal generated by said generating section with said second digital TV signal converted by said signal converting portion.

5. The reception performance measuring apparatus according to claim 4, further comprising:
    an output portion configured to output a result of determination executed by said determining section.

6. The reception performance measuring apparatus according to claim 5, wherein said predetermined level is outputted to said output portion.

7. The reception performance measuring apparatus according to claim 1, wherein said generating section includes a signal modulating portion configured to modulate said generated digital TV signal into an electric wave and outputting the electric wave.

8. The reception performance measuring apparatus according to claim 1, wherein said signal comparing section includes a signal converting portion configured to receive said analog TV signal after said reception processing, to convert said analog TV signal into said digital TV signal for said comparison, and to compare said digital TV signal generated by said generating section with said digital TV signal converted by said signal converting portion.

9. The reception performance measuring apparatus according to claim 1, further comprising:
    an output portion configured to output a result of determination executed by said determining section.

10. The reception performance measuring apparatus according to claim 9, wherein said predetermined level is outputted to said output portion.

11. A method for measuring performance of a reception processing device of a television (TV) signal, comprising:
    generating a digital TV signal;
    generating noise of a selected type and level;
    outputting the digital TV signal to a reception processing device; outputting the noise to the reception processing device such that the noise is added to the digital TV signal;
    processing the digital TV signal with the noise added to the digital TV signal in the reception processing device;
    outputting an analog TV signal corresponding to the processed digital TV signal with the noise added to the digital TV signal;
    converting the analog TV signal into a second digital TV signal;
    detecting a difference between the digital TV signal and the second digital TV signal.

12. The method of claim 11, further comprising:
    determining a performance of the reception processing device based on the detecting.

13. The method of claim 12, wherein determining comprises:
    determining a bit error rate of the second digital TV signal.

14. The method of claim 12, further comprising:
    adjusting the level of the noise based on the performance.

15. The method of claim 14, further comprising:
    adjusting the type of the noise based on the performance.

* * * * *